March 12, 1929.  J. M. TEAHEN  1,705,343
FLOAT VALVE
Filed Jan. 23, 1928

Inventor
James M. Teahen

Patented Mar. 12, 1929.

1,705,343

UNITED STATES PATENT OFFICE.

JAMES M. TEAHEN, OF DETROIT, MICHIGAN.

FLOAT VALVE.

Application filed January 23, 1928. Serial No. 248,739.

The invention relates to float valves of that type designed for use in connection with flushing tanks for water closets and has for its object the obtaining of a more durable construction and one which can be quickly repaired when necessary.

In the present state of the art float valves are generally formed by hollow balls of soft rubber vented on the under side and having an operating stem attached at the top. Such constructions are defective due to the fact that soft rubber when immersed in water for a certain length of time will absorb moisture and grow in size. As a consequence the valve may come into contact with the wall of the tank or some other part of the apparatus which will hold it from properly seating. Other constructions have been made where the ball is formed of harder material and is provided with a gasket of soft rubber for engaging the seat. These are defective in that the suction produced by lifting the valve from its seat is frequently sufficient to pull the gasket off from the ball.

To overcome the defects of such constructions I have devised a float valve in which the body is made of a hard substance, preferably hard vulcanized rubber and is provided with a soft rubber gasket for seating. This gasket is however so firmly clamped to the ball as to overcome any tendency to pull it off. The construction is also one which permits of quickly renewing the gasket whenever necessary. The invention therefore consists in the novel construction as hereinafter set forth.

Figure 1:
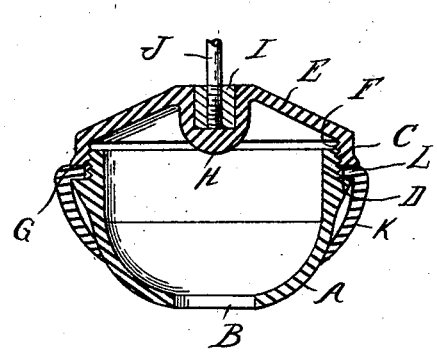
Figure 1 is a vertical central section showing my improved float valve in engagement with the valve seat.
Figure 2:
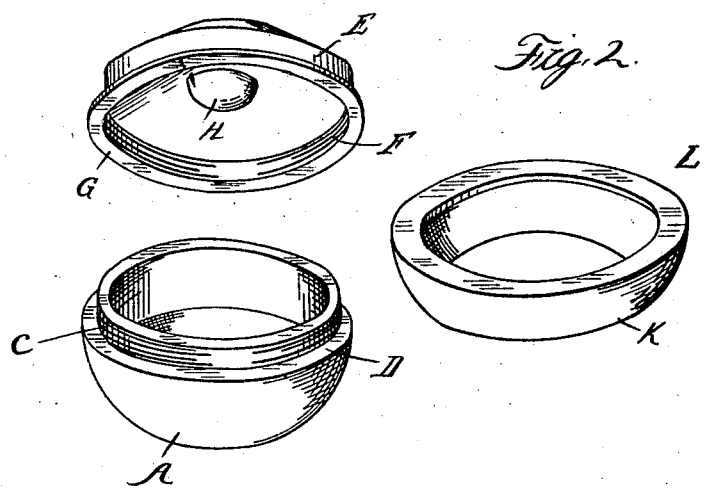
Figure 2 is a perspective view of the parts composing the float valve detached.

The body of my improved float valve is preferably formed of hard vulcanized rubber and comprises a lower section A of substantially semi-spherical form having a central opening B on the bottom thereof and provided at its upper edge portion with a threaded flange C and an outwardly extending annular shoulder D beneath said flange. E is a cap member for completing the body of the ball this being provided with an interiorly threaded portion F for engaging the threaded portion C and a shoulder G opposed to the shoulder D. The cap E is provided with the central boss H in which is embedded a metallic plug I having a threaded aperture therein for the engagement of the operating stem J. K is the soft rubber gasket which is of a segmental spherical form provided at its upper end with an inwardly extending annular flange L. This flange L is adapted to fit between the shoulders D and G while the segmental spherical portion of the gasket fits over the semispherical portion A of the body. Thus when the cap E is screwed into engagement with the member A it will clamp the flange L so securely as to hold the gasket from displacement. This flange also seals the joint between the members A and E so as to make the same air and water tight.

With the construction as shown, the gasket K which preferably tapers to an edge at its lower end will overlie the portion A but is preferably slightly nonparallel thereto so that the central portion of the gasket is spaced slightly from the body. This will render the gasket exceedingly soft and pliable so that in seating it will produce an effective water seal.

The construction is also such that the lower edge of the gasket is of considerably smaller radius than the valve seat thereby avoiding any possibility of catching on the seat so as to hold the surface out of sealing contact.

As the body of the valve is made of hard rubber which is imprevious to water it will always maintain its shape, the gasket being relatively small and being made of high grade material which will have a much longer life than the soft rubber balls usually employed. If, however, it should any time become inoperative it could be quickly replaced by another gasket by unscrewing the cap from the body of the ball.

Another advantage of the construction is that the ball being made in the two sections it can be molded without the use of cores which decrease the cost of manufacture.

What I claim as my invention is:

1. A float valve comprising a hollow hemispherical member formed of hard material, an annular segmental spherical gasket of soft material overlying a portion of the surface of said hard member and means for clamping the outer edge portion of said gasket to said hard member.

2. A float valve comprising a hollow hemispherical member formed of hard material, a cap member having a threaded engagement with said hollow hemispherical member, an annular segmental spherical gasket formed of soft material overlying a portion of said hemispherical surface, said gasket having a portion adjacent to the outer edge thereof clamped between said hemispherical member and cap member.

3. A float valve comprising a hollow member of hard material formed in sections having a threaded engagement with each other and presenting opposed shoulders, the lowermost of said members being of hemispherical form, an annular gasket formed of soft material overlying a portion of said hemispherical member and provided with a flange projecting inwardly from its outer edge portion between said opposed shoulders whereby the screwing of said sections together clamps said flange to retain the gasket and to also seal the joint between the sections.

4. A float valve comprising a hemispherical section formed of hard vulcanized rubber and having a threaded portion adjacent to its edge and a shoulder adjacent to said threaded portion, a cap portion formed of the same material and threaded to engage the threaded portion of said hemispherical member and also provided with an opposed shoulder, an annular gasket of soft rubber having a portion overlying said hemispherical member and also having a flange projecting inwardly between said opposed shoulders whereby the screwing of said sections together will clamp said flange to retain said gasket and to seal the joint.

5. A float valve comprising a hollow hemispherical member formed of hard vulcanized rubber and having a threaded portion adjacent to its edge with a shoulder adjacent to said threaded portion, a cap formed of the same material threaded to engage the threads of said hemispherical portion and provided with an opposed shoulder, a soft rubber gasket having a segmental spherical portion overlying said hemispherical member and slightly nonparallel thereto being tapered at one end to a thin edge and provided with a flange at its opposite end extending inwardly between said shoulders whereby the screwing of said sections together will clamp said clamps to retain the gasket and to seal the joint.

In testimony whereof I affix my signature.

JAMES M. TEAHEN.